United States Patent
Miyazawa

(10) Patent No.: US 11,314,065 B2
(45) Date of Patent: Apr. 26, 2022

(54) ZOOM LENS AND IMAGE PICKUP APPARATUS

(71) Applicant: CANON KABUSHIKI KAISHA, Tokyo (JP)

(72) Inventor: Nobuyuki Miyazawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/126,560

(22) Filed: Dec. 18, 2020

(65) Prior Publication Data

US 2021/0199938 A1     Jul. 1, 2021

(30) Foreign Application Priority Data

Dec. 25, 2019     (JP) .............................. JP2019-233678

(51) Int. Cl.
  *G02B 15/14*     (2006.01)
  *G02B 15/16*     (2006.01)

(52) U.S. Cl.
  CPC ................ *G02B 15/144113* (2019.08); *G02B 15/145129* (2019.08); *G02B 15/16* (2013.01)

(58) Field of Classification Search
  CPC .... G02B 15/144113; G02B 15/145129; G02B 15/16; G02B 15/14
  USPC ....................................................... 359/687
  See application file for complete search history.

(56) References Cited

U.S. PATENT DOCUMENTS

| 8,804,243 B2 | 8/2014 | Hatakeyama | |
| 9,297,988 B2 | 3/2016 | Sudoh | |
| 2012/0099202 A1* | 4/2012 | Hatakeyama | G02B 27/646 |
| | | | 359/557 |
| 2015/0070780 A1* | 3/2015 | Sudoh | G02B 15/144113 |
| | | | 359/687 |

FOREIGN PATENT DOCUMENTS

| JP | 2012088618 A | 5/2012 |
| JP | 2015055722 A | 3/2015 |

\* cited by examiner

*Primary Examiner* — James R Greece
(74) *Attorney, Agent, or Firm* — Rossi, Kimms & McDowell LLP

(57) ABSTRACT

A zoom lens includes, in order from an object side to an image side, a first lens unit having a positive refractive power, a second lens unit having a negative refractive power, one or two intermediate lens units having positive refractive powers, and a final lens unit having a positive power. A distance between each pair of adjacent lens units changes in zooming from a wide-angle end to a telephoto end. The one or two intermediate lens units include three or four lenses. The one or two intermediate lens units include a single lens having a positive refractive power and being closest to the image side. The final lens unit includes three or four lenses. The zoom lens satisfies specified conditional expressions.

9 Claims, 11 Drawing Sheets

ZOOM LENS AND IMAGE PICKUP APPARATUS

BACKGROUND OF THE INVENTION

Field of the Invention

The present invention relates to a zoom lens and an image pickup apparatus.

Description of the Related Art

The definition of recent display units has become higher and higher, and the image quality of zoom lenses used in an image pickup apparatus, such as a digital camera, a video camera, and a TV camera, has accordingly become higher and higher. In the future, inexpensive and compact zoom lenses will be demanded for further popularization.

Compact zoom lenses that can efficiently secure a magnification variation ratio have conventionally been known. Japanese Patent Laid-Open No. ("JP") 2015-55722 discloses a zoom lens having a magnification of about 20 times that includes, in order from an object side to an image side, lens units having positive, negative, positive, and positive refractive powers, wherein the first lens unit is fixed during magnification varying. JP 2012-88618 discloses a zoom lens having a magnification of about 10 times that includes, in order from the object side to the image side, lens units having positive, negative, positive, positive, and positive refractive powers, wherein the first, third, and fifth lens units are fixed during magnification varying.

The zoom lens disclosed in JP 2015-55722 has a long, overall optical length. It is difficult for the zoom lens disclosed in JP 2012-88618 to achieve both a compact structure and a high magnification.

SUMMARY OF THE INVENTION

An aspect of embodiments provides, for example, a zoom lens beneficial in compactness, a high magnification, and a high optical performance.

A zoom lens according to one aspect of the present invention includes, in order from an object side to an image side, a first lens unit having a positive refractive power, a second lens unit having a negative refractive power, one or two intermediate lens units having positive refractive powers, and a final lens unit having a positive power. A distance between each pair of adjacent lens units changes in zooming from a wide-angle end to a telephoto end. The one or two intermediate lens units include three or four lenses. The one or two intermediate lens units include a single lens having a positive refractive power and being closest to the image side. The final lens unit includes three or four lenses. Following conditional expressions are satisfied:

$$0.50 < LDt/ft < 1.00$$

$$-1.40 < Dpow/f2 < -0.27$$

where LDt is an overall optical length of the zoom lens at the telephoto end, ft is a focal length of the zoom lens at the telephoto end, Dpow is an air spacing length on the object side adjacent to the single lens at the wide-angle end, and f2 is a focal length of the second lens unit.

An image pickup apparatus according to another aspect includes the above zoom lens, and an image pickup element configured to capture an image formed by the zoom lens.

Further features of the present invention will become apparent from the following description of exemplary embodiments with reference to the attached drawings.

DESCRIPTION OF THE EMBODIMENTS

Figure 1:
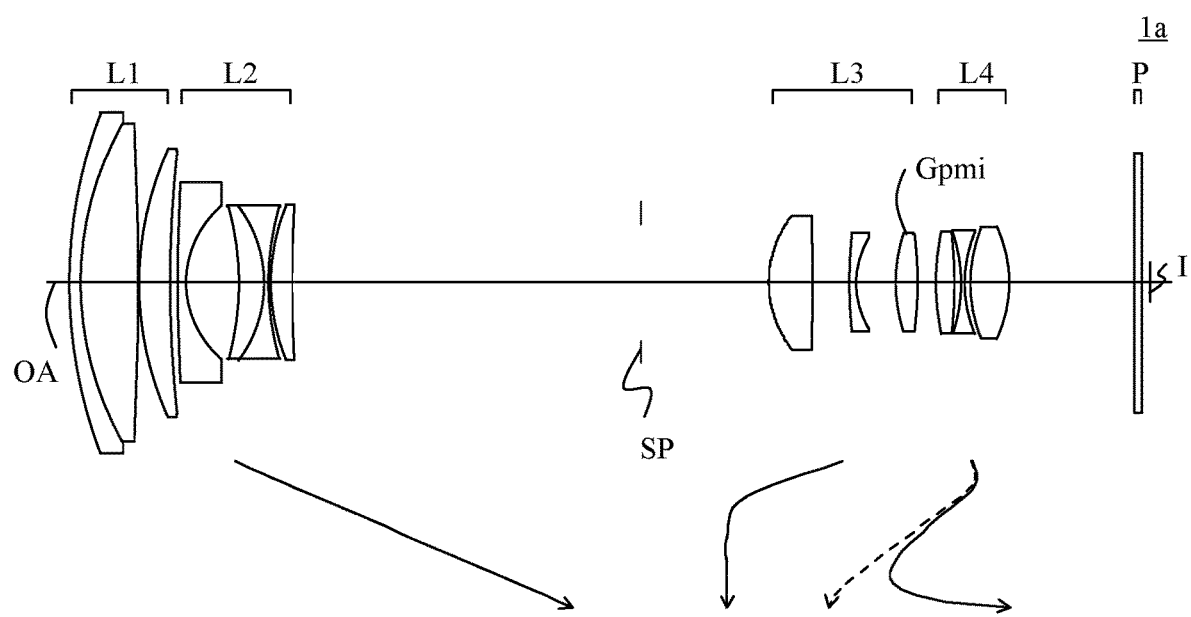
FIG. 1 is a sectional view of an optical system in Example 1.
Figure 2:
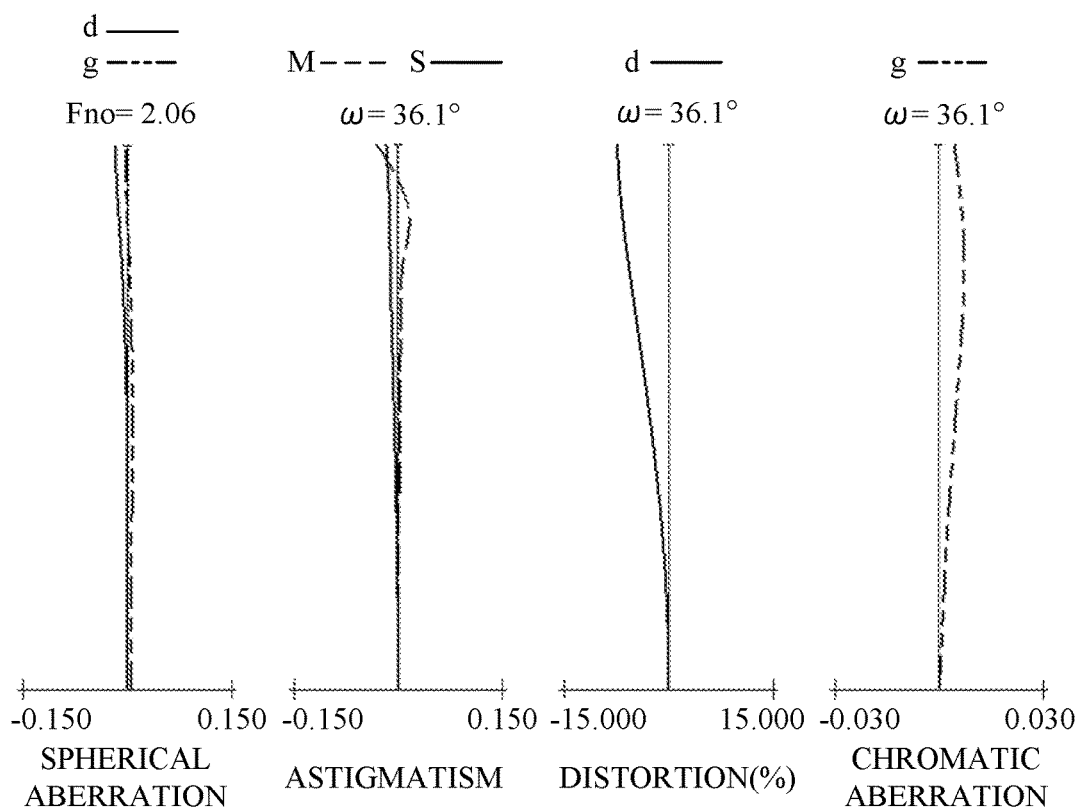
FIG. 2 is an aberration diagram at a wide-angle end of the optical system in Example 1.
Figure 3:
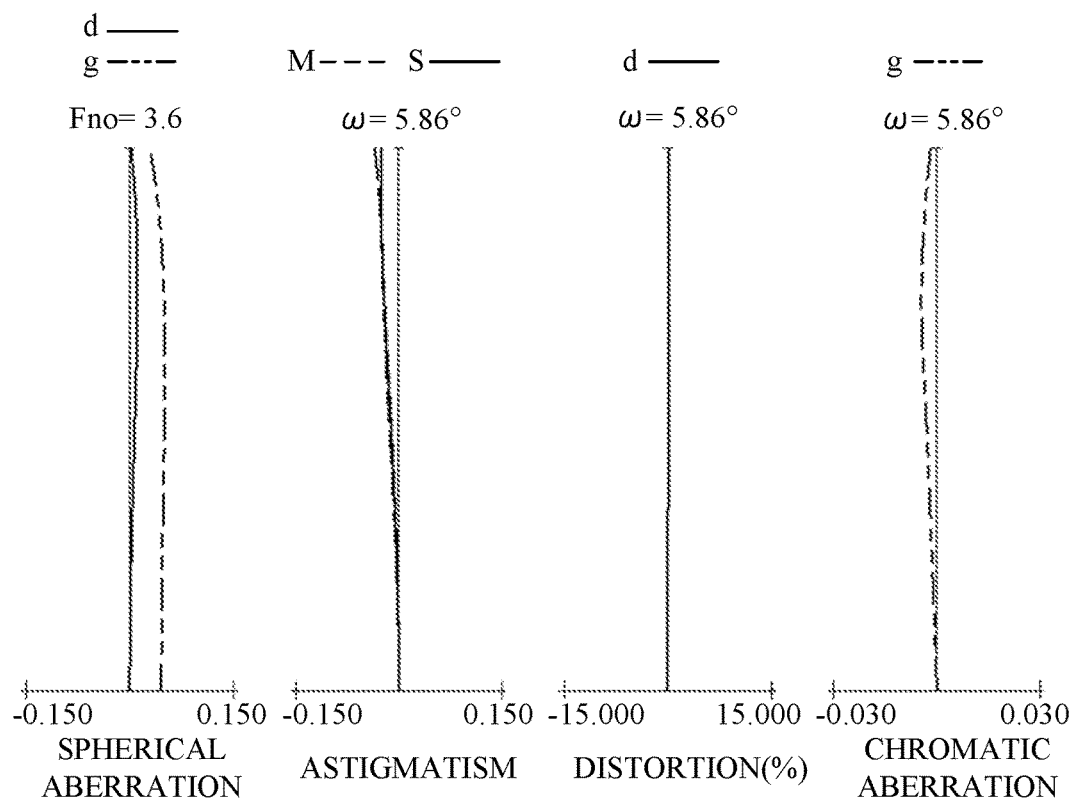
FIG. 3 is an aberration diagram at a middle focal length of the optical system in Example 1.
Figure 4:
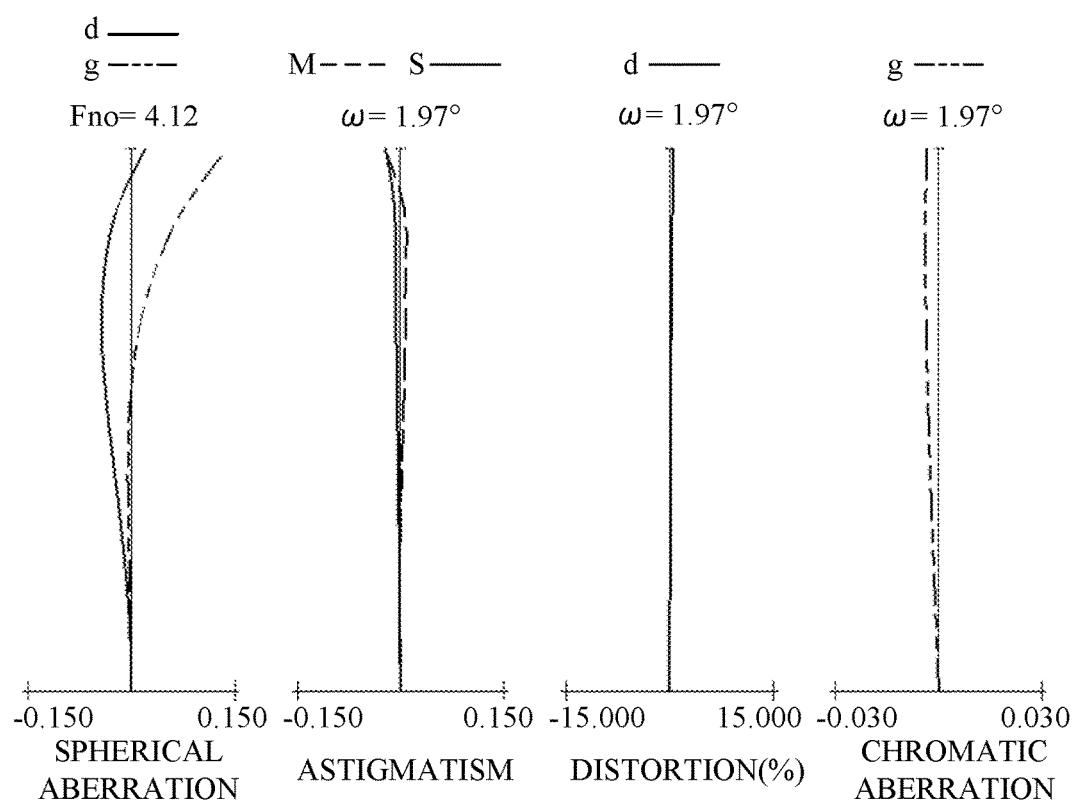
FIG. 4 is an aberration diagram at a telephoto end of the optical system in Example 1.

Referring now to the accompanying drawings, a detailed description will be given of embodiments according to the present invention.

A description will now be given of an outline of a zoom lens according to each example. A zoom lens according to each example includes, in order from an object side to an image side, a first lens unit having a positive refractive power, a second lens unit having a negative refractive power, and a middle lens unit having a positive refractive power and one or two lens units, and a final lens unit having a positive refractive power. A distance between adjacent lens units changes during zooming from a wide-angle end to a telephoto end. Thereby, the zoom lens according to each example has a configuration suitable for a high magnification zoom. The one or two middle lens units include three or four lenses. The final lens unit includes three or four lenses.

Thereby, it is possible to obtain a compact size and good optical performance while reducing the number of lenses in the zoom lens. The middle lens units have a single lens Gpmi having a positive refractive index closest to an image plane. Thereby, a spherical aberration and a coma can be corrected.

The zoom lens according to each example satisfies the following conditional expressions (1) and (2):

$$0.50 < LDt/ft < 1.00 \qquad (1)$$

$$-1.40 < Dpow/f2 < -0.27 \qquad (2)$$

where LDt is an overall optical length at the telephoto end of the zoom lens, ft is a focal length at the telephoto end of the zoom lens, Dpow is adjacent air spacing on the object side at the wide-angle end of the single lens Gpmi, and f2 is a focal length of the second lens unit. The overall optical length is a length obtained by adding the backfocus to the overall length of the zoom lens. If there is a glass block or the like in the backfocus, the backfocus extended by the glass block or the like is also added.

The conditional expression (1) defines a ratio between the overall optical length at the telephoto end and the focal length at the telephoto end. If the value is higher than the upper limit of the conditional expression (1), the overall optical length becomes disadvantageously long. On the other hand, when the value is lower than the lower limit of the conditional expression (1), it becomes difficult to correct the spherical aberration and the axial chromatic aberration at the telephoto end.

The conditional expression (2) defines a ratio of the adjacent air spacing on the object side at the wide-angle end of the positive single lens Gpmi closest to the image plane in the middle lens units to the focal length of the second lens unit. If the value is higher than the upper limit of the conditional expression (2), the overall length of the zoom lens becomes disadvantageously long or it becomes difficult to correct a difference in spherical aberration for each wavelength. On the other hand, when the value is lower than the lower limit of the conditional expression (2), it becomes difficult to correct the fluctuation of the curvature of field during zooming.

The zoom lens according to each example may satisfy the following conditional expression (3).

$$Dpot - Dpow \leq 0.00 \qquad (3)$$

where Dpot is adjacent air spacing on the object side of the positive single lens Gpmi closest to the image plane in the middle lens units at the telephoto end. The conditional expression (3) defines a ratio of the adjacent air spacing on the object side of the single lens Gpmi at the telephoto end to the adjacent air spacing on the adjacent object side of the single lens Gpmi at the wide-angle end. If the value is higher than the upper limit of the conditional expression (3), it becomes difficult to efficiently obtain a magnification variation ratio.

In the zoom lens according to each embodiment, at least the second lens unit and the final lens unit may move during zooming (magnification varying). Moving the second lens unit can efficiently secure the magnification ratio. The final lens unit can correct the image plane movement due to zooming, and can also correct the fluctuation of the lateral chromatic aberration during zooming.

The zoom lens according to each example may satisfy the following conditional expression (4).

$$0.23 < M2/LDt < 0.43 \qquad (4)$$

where M2 is a moving amount of the second lens unit from the wide-angle end to the telephoto end. The moving amount M2 has a positive sign when the second lens unit is closer to the image plane at the telephoto end than at the wide-angle end. The conditional expression (4) defines a ratio of the moving amount of the second lens unit from the wide-angle end to the telephoto end to the overall optical length at the telephoto end. If the value is higher than the upper limit of the conditional expression (4), a front lens diameter becomes disadvantageously large. On the other hand, if the value is lower than the lower limit of the conditional expression (4), the overall length becomes disadvantageously long.

The zoom lens according to each example may satisfy the following conditional expression (5).

$$0.22 < M2/ft < 0.34 \qquad (5)$$

The conditional expression (5) defines a ratio of the moving amount of the second lens unit from the wide-angle end to the telephoto end to the focal length at the telephoto end. If the value is higher than the upper limit of the conditional expression (5), the front lens diameter becomes disadvantageously large. On the other hand, when the value is lower than the lower limit of the conditional expression (5), it becomes difficult to correct the fluctuation of the curvature of field during zooming.

The zoom lens according to each example may satisfy the following conditional expression (6).

$$0.06 < Dpow/f3 < 0.50 \qquad (6)$$

where f3 is a focal length of the middle lens unit (third lens unit) on the object side in the one or two middle lens units. The conditional expression (6) defines a ratio of adjacent air spacing on the object side of the positive single lens Gpmi closest to the image plane in the middle lens units at the telephoto end to the focal length of the third lens unit. If the value is higher than the upper limit of the conditional expression (6), it becomes difficult to correct the astigmatism and distortion at the wide-angle end. On the other hand, if the value is lower than the lower limit of the conditional expression (6), it becomes difficult to correct a difference in spherical aberration for each wavelength.

The zoom lens according to each example may satisfy the following conditional expression (7).

$$-0.38 < M3/M2 < -0.21 \qquad (7)$$

where M3 is a moving amount from the wide-angle end to the telephoto end of the middle lens unit (third lens unit) on the object side in the one or two middle lens units. The moving amount M3 has a positive sign when the third lens unit is closer to the image plane at the telephoto end than at the wide-angle end. The conditional expression (7) defines a ratio of the moving amount M3 of the third lens unit from the wide-angle end to the telephoto end to the moving amount M2 of the second lens unit from the wide-angle end to the telephoto end. If the value is higher than the upper limit of the conditional expression (7), the front lens diameter becomes disadvantageously large. On the other hand, when the value is lower than the lower limit of the conditional expression (7), it becomes difficult to efficiently secure the magnification varying ratio.

In the zoom lens according to each example, at least the first lens unit may be fixed during zooming (the first lens unit may not move during zooming). The first lens unit has a large mass, and it is disadvantageous to move the first lens unit because the actuator becomes large and the mechanism becomes complicated. The aperture stop may be fixed relative to the image plane during zooming. If the aperture stop moves in the direction along the optical axis OA (optical axis direction) during zooming, the mechanism becomes complicated and the diameter of the lens unit becomes large. The final lens unit may be moved from the image side to the object side when the object to be focused changes from a long distance to a short distance. Setting the final lens unit to a focus unit can restrain the optical performance from changing during focusing from the long distance to the short distance over the entire range from the wide-angle end to the telephoto end. The magnification varying ratio is 18 times or more. When the magnification varying ratio is small, it becomes difficult to obtain the effects of each example.

At least one of the numerical ranges of the conditional expressions (1) to (7) may be set as in the following conditional expressions (1a) to (7a), respectively.

$$0.55 < LDt/ft < 1.00 \quad (1a)$$

$$-1.25 < Dpow/f2 < -0.27 \quad (2a)$$

$$-12.00 < Dpot - Dpow \leq 0.00 \quad (3a)$$

$$0.24 < M2/LDt < 0.42 \quad (4a)$$

$$0.23 < M2/ft < 0.33 \quad (5a)$$

$$0.07 < Dpow/f3 < 0.40 \quad (6a)$$

$$-0.37 < M3/M2 < -0.22 \quad (7a)$$

At least one of the numerical ranges of the conditional expressions (1a) to (7a) may be set as in the following conditional expressions (1b) to (7b), respectively.

$$0.59 < LDt/ft < 1.00 \quad (1b)$$

$$-1.11 < Dpow/f2 < -0.27 \quad (2b)$$

$$-10.52 < Dpot - Dpow < 0.00 \quad (3b)$$

$$0.24 < M2/LDt < 0.41 \quad (4b)$$

$$0.23 < M2/ft < 0.32 \quad (5b)$$

$$0.07 < Dpow/f3 < 0.34 \quad (6b)$$

$$-0.36 < M3/M2 < -0.22 \quad (7b)$$

Referring now to FIGS. 1 to 20, a description will be given of a zoom lens according to each embodiment. FIGS. 1, 5, 9, 13, and 17 are sectional views of zoom lenses (optical systems) 1a to 1e according to Examples 1 to 5, respectively. FIGS. 2, 6, 10, 14, and 18 are aberration diagrams at the wide-angle end of each of the zoom lenses according to Examples 1 to 5. FIGS. 3, 7, 11, 15, and 19 are aberration diagrams at middle focal lengths of the zoom lenses according to Examples 1 to 5. FIGS. 4, 8, 12, 16, and 20 are aberration diagrams at the telephoto end of each of the zoom lenses according to Examples 1 to 5. In each aberration diagram, d and g represent the d-line and the g-line, respectively, and M and S represent a meridional image plane and a sagittal image plane, respectively. The chromatic aberration of magnification is indicated by the g-line.

In the sectional views of the zoom lenses shown in FIGS. 1, 5, 9, 13, and 17, L1 is a first lens unit, L2 is a second lens unit, L3 is a third lens unit, and L4 is a fourth lens unit. L5 is a fifth lens unit. SP is a diaphragm (aperture stop), P is a glass block such as a face plate or a low-pass filter, and I is an image plane. In the zoom lens in each example, during zooming from the wide-angle end to the telephoto end, each lens unit is moved as shown by arrows in FIGS. 1, 5, 9, 13, and 17. Solid and dotted arrows in each figure are moving loci during focusing on an object at infinity and a short-distance object, respectively.

Figure 5:
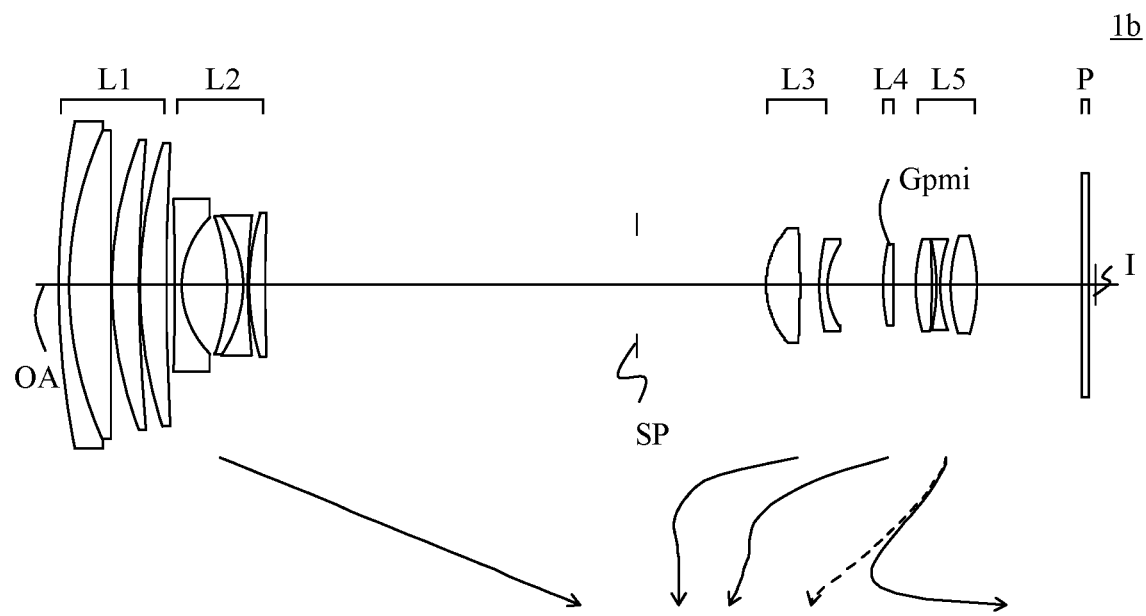
FIG. 5 is a sectional view of an optical system in Example 2.
Figure 6:
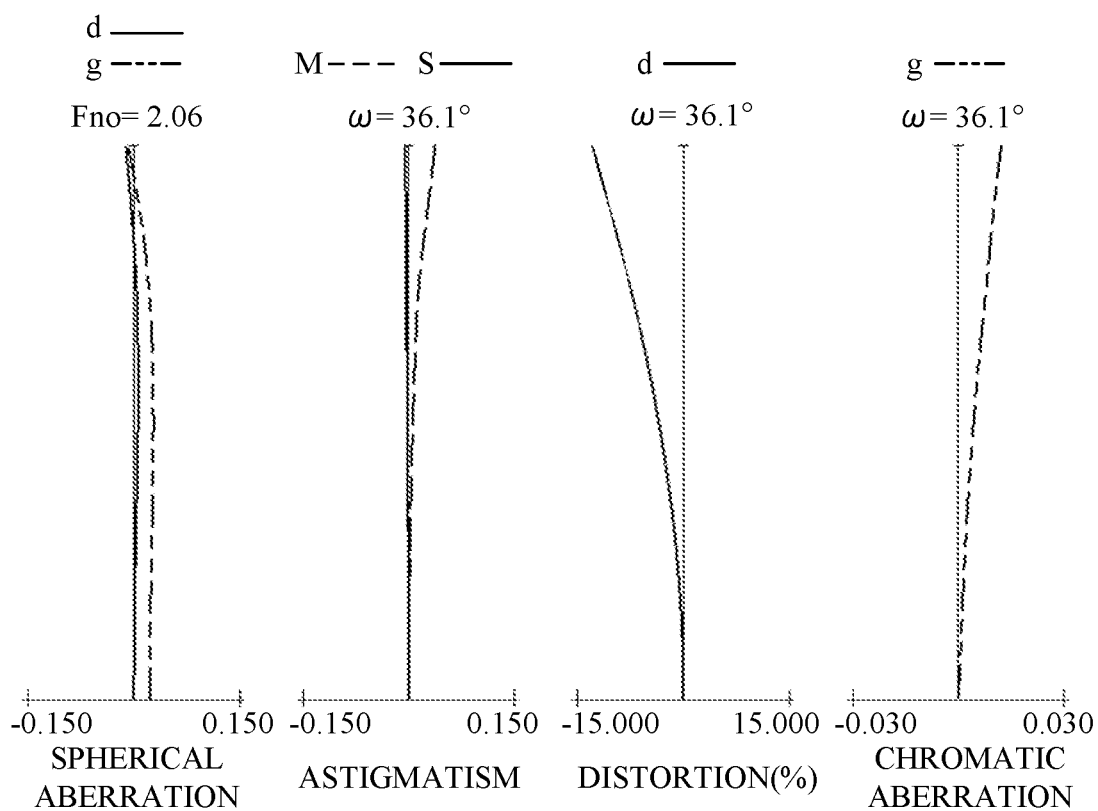
FIG. 6 is an aberration diagram at a wide-angle end of the optical system in Example 2.
Figure 7:
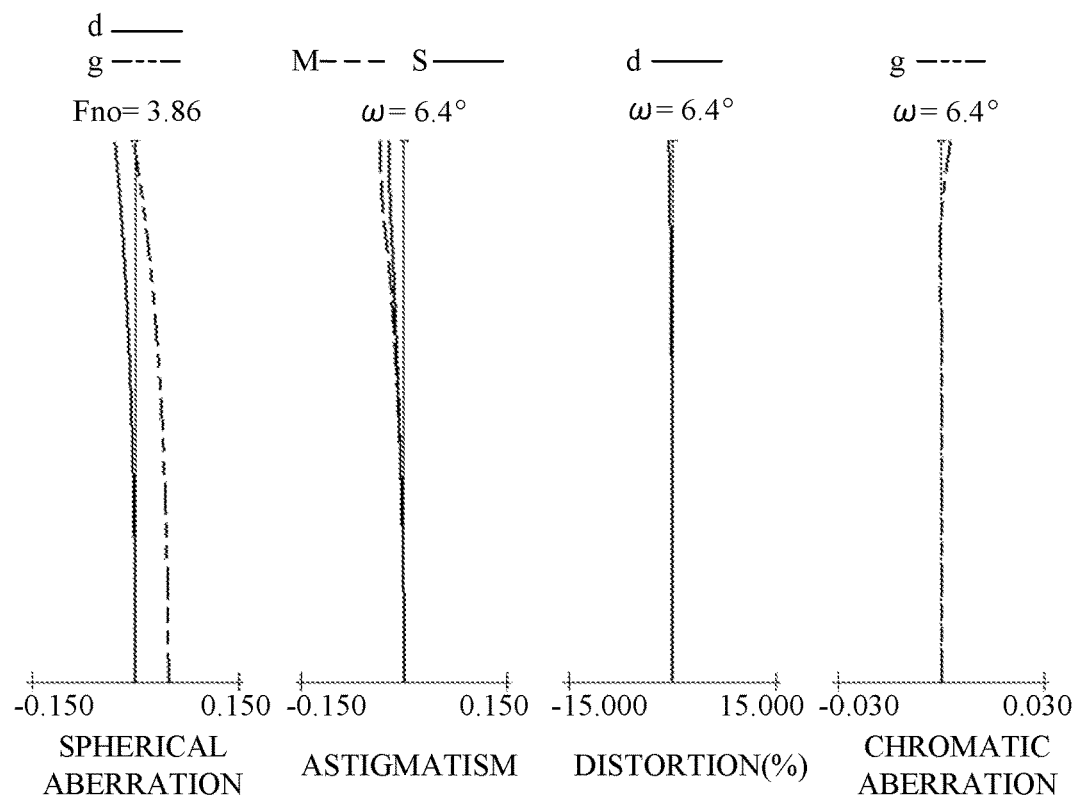
FIG. 7 is an aberration diagram at a middle focal length of the optical system in Example 2.
Figure 8:
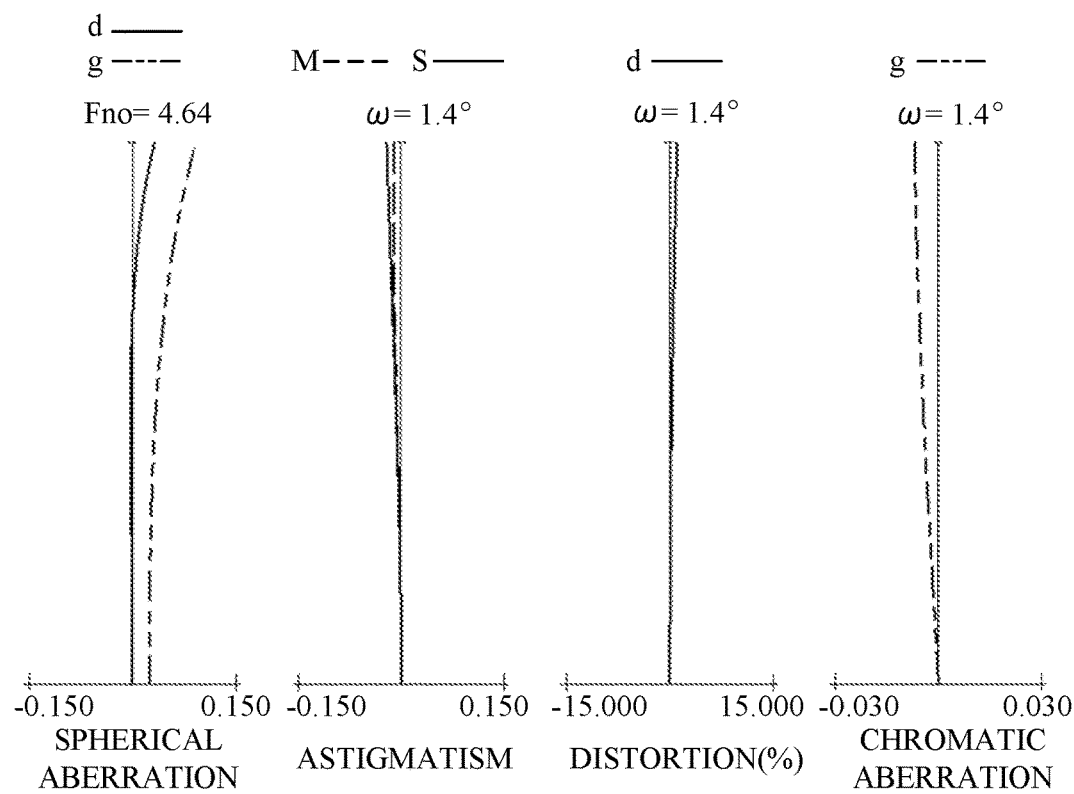
FIG. 8 is an aberration diagram at a telephoto end of the optical system in Example 2.
Figure 9:
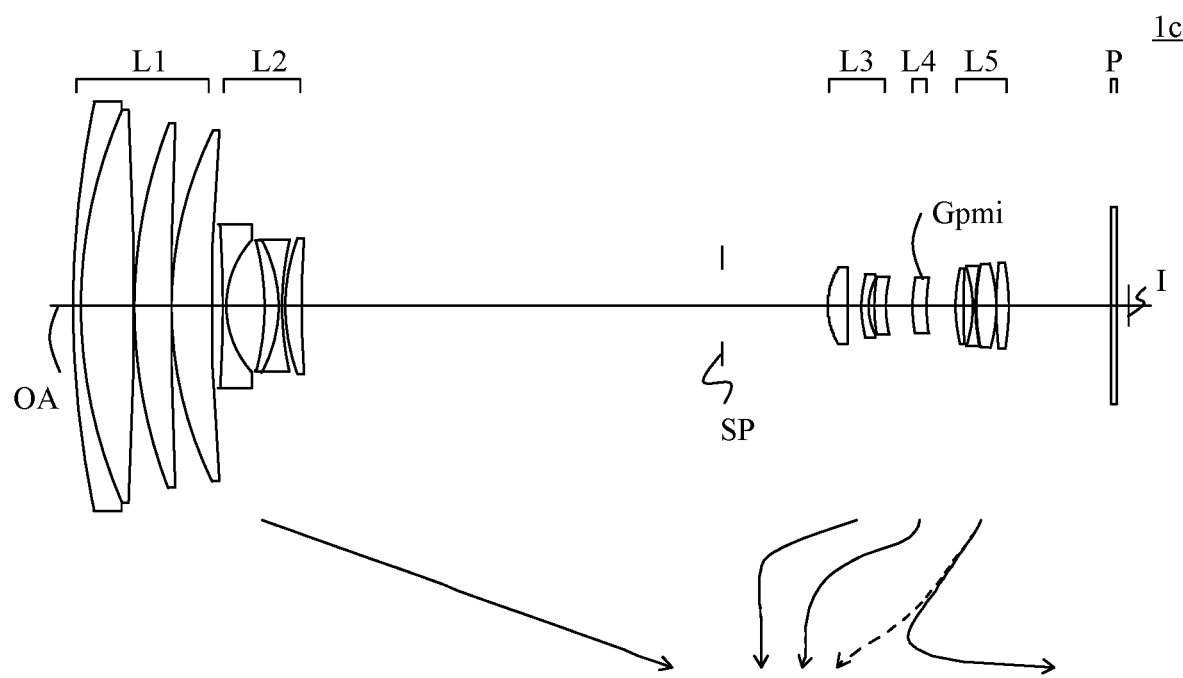
FIG. 9 is a sectional view of an optical system in Example 3.
Figure 10:
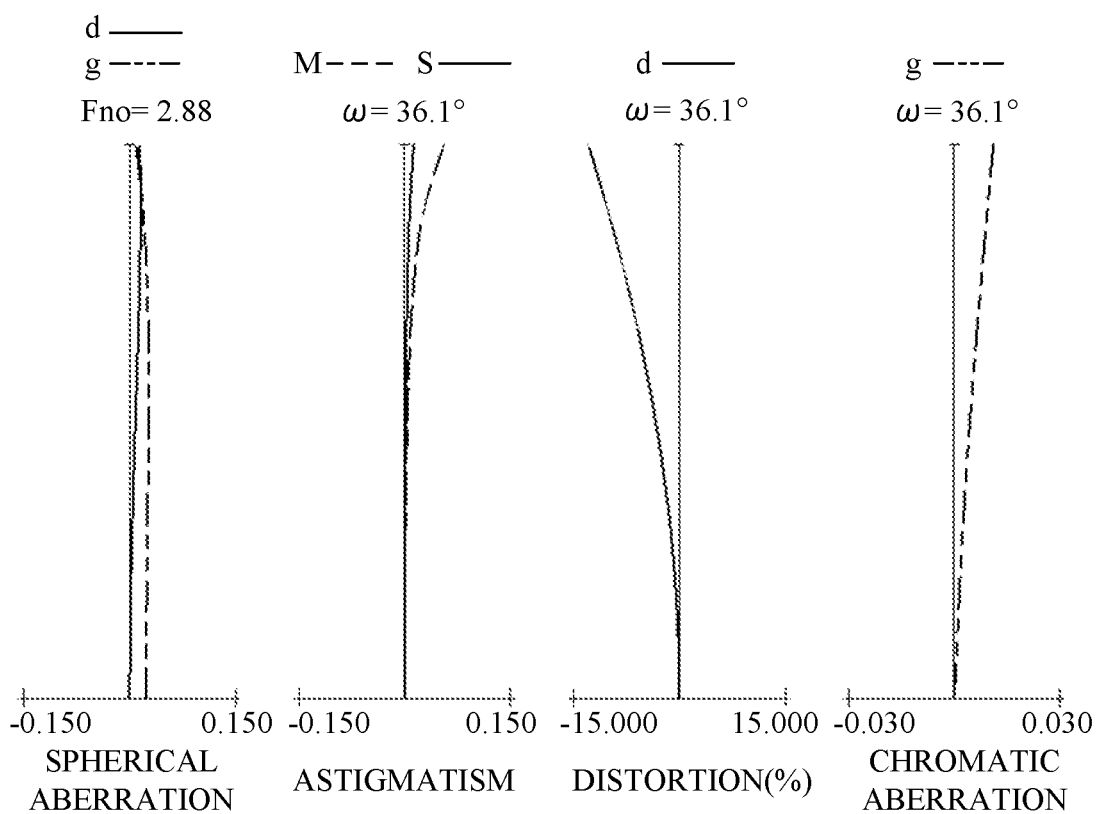
FIG. 10 is an aberration diagram at a wide-angle end in Example 3.
Figure 11:
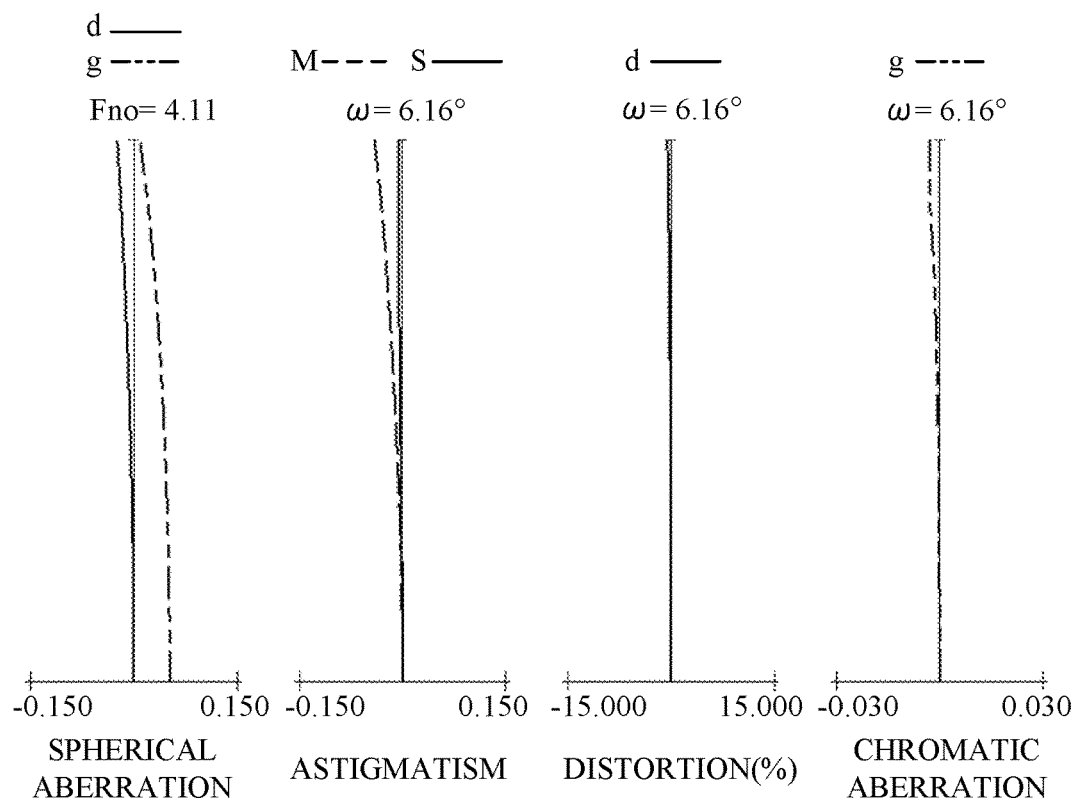
FIG. 11 is an aberration diagram at a middle focal length in Example 3.
Figure 12:
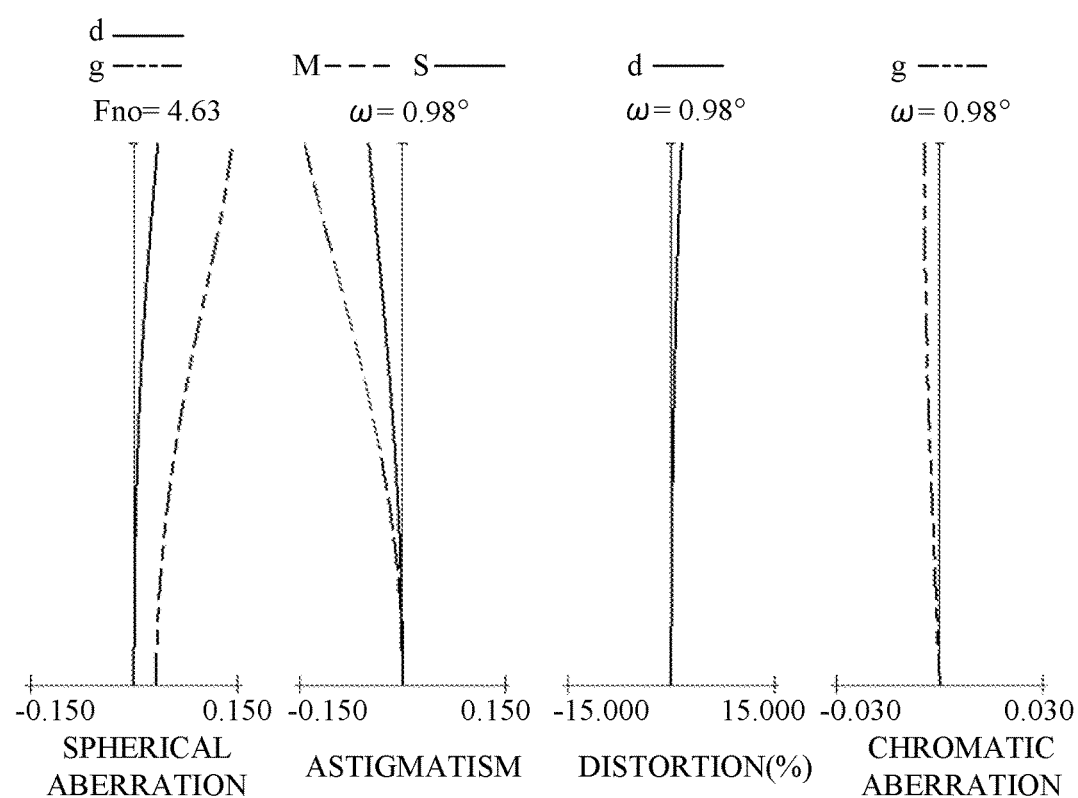
FIG. 12 is an aberration diagram at a telephoto end in Example 3.
Figure 13:
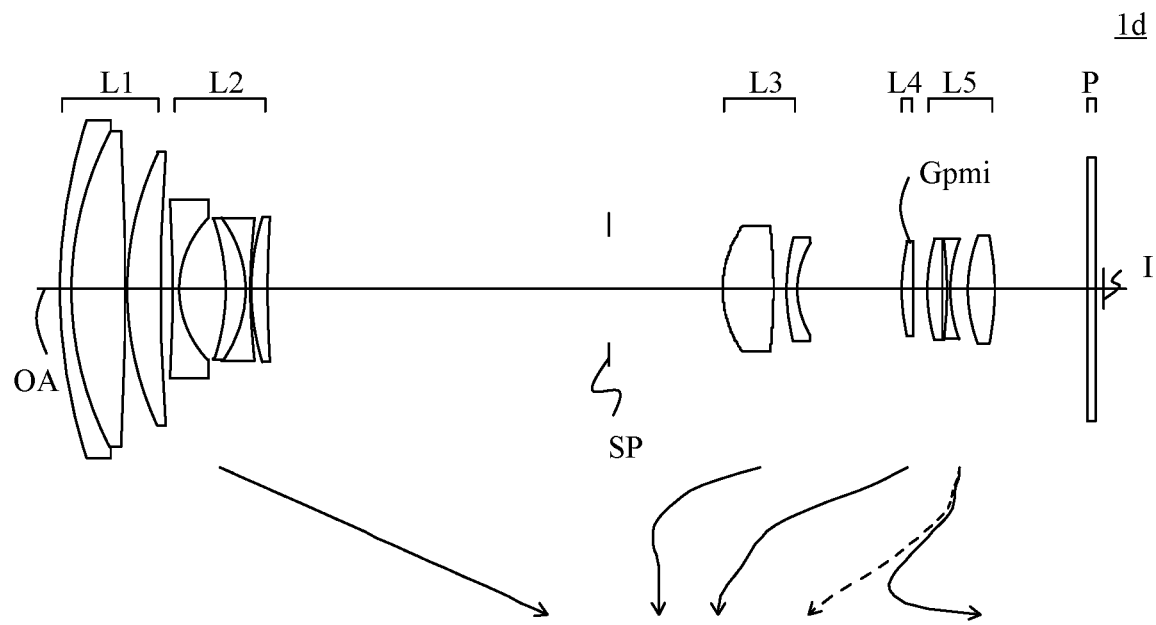
FIG. 13 is a sectional view of an optical system in Example 4.
Figure 14:
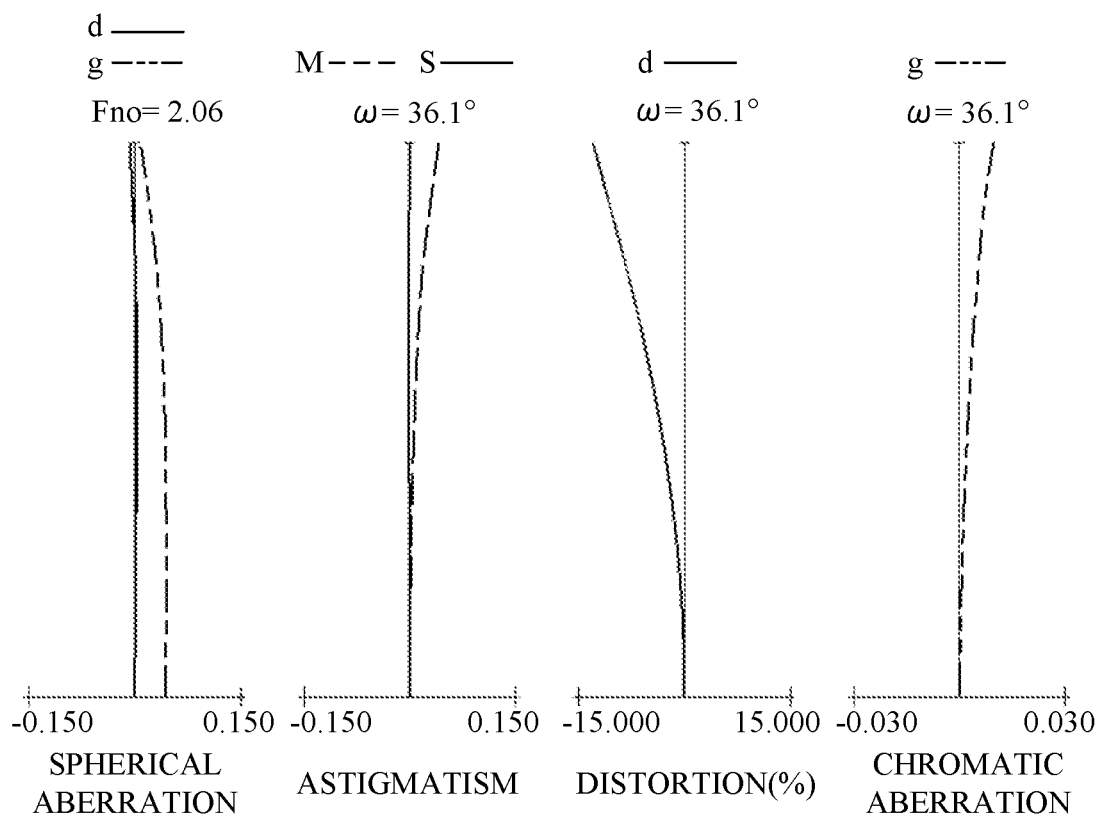
FIG. 14 is an aberration diagram at a wide-angle end in Example 4.
Figure 15:
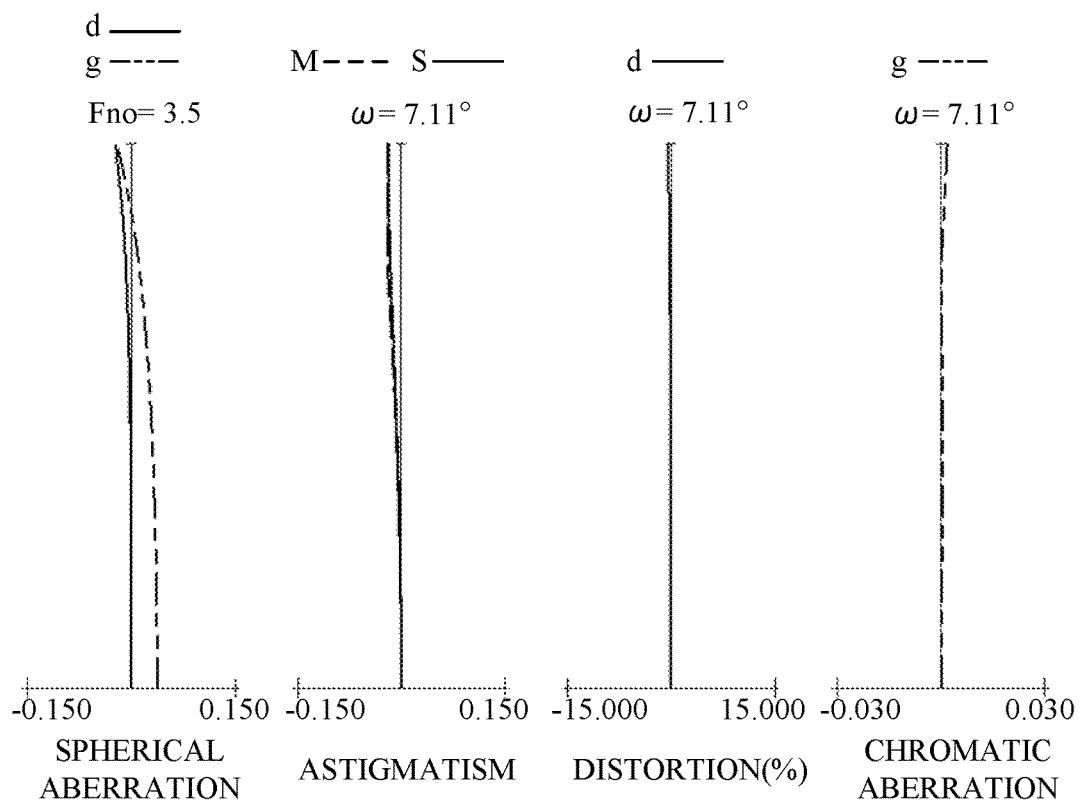
FIG. 15 is an aberration diagram at a middle focal length in Example 4.
Figure 16:
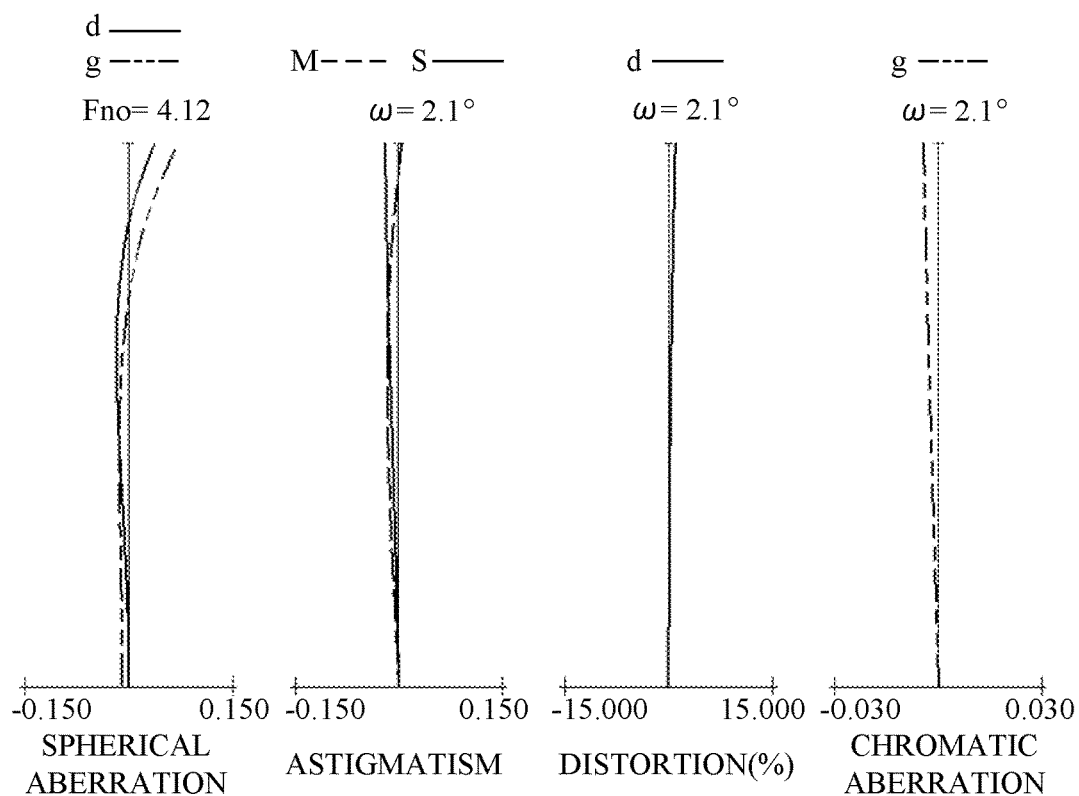
FIG. 16 is an aberration diagram at a telephoto end in Example 4.
Figure 17:
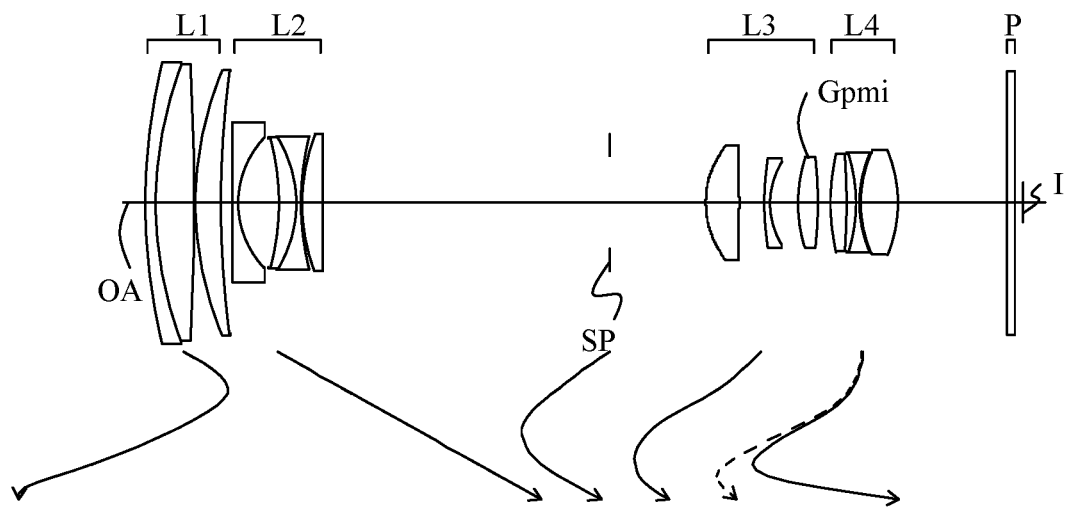
FIG. 17 is a sectional view of an optical system in Example 5.
Figure 18:
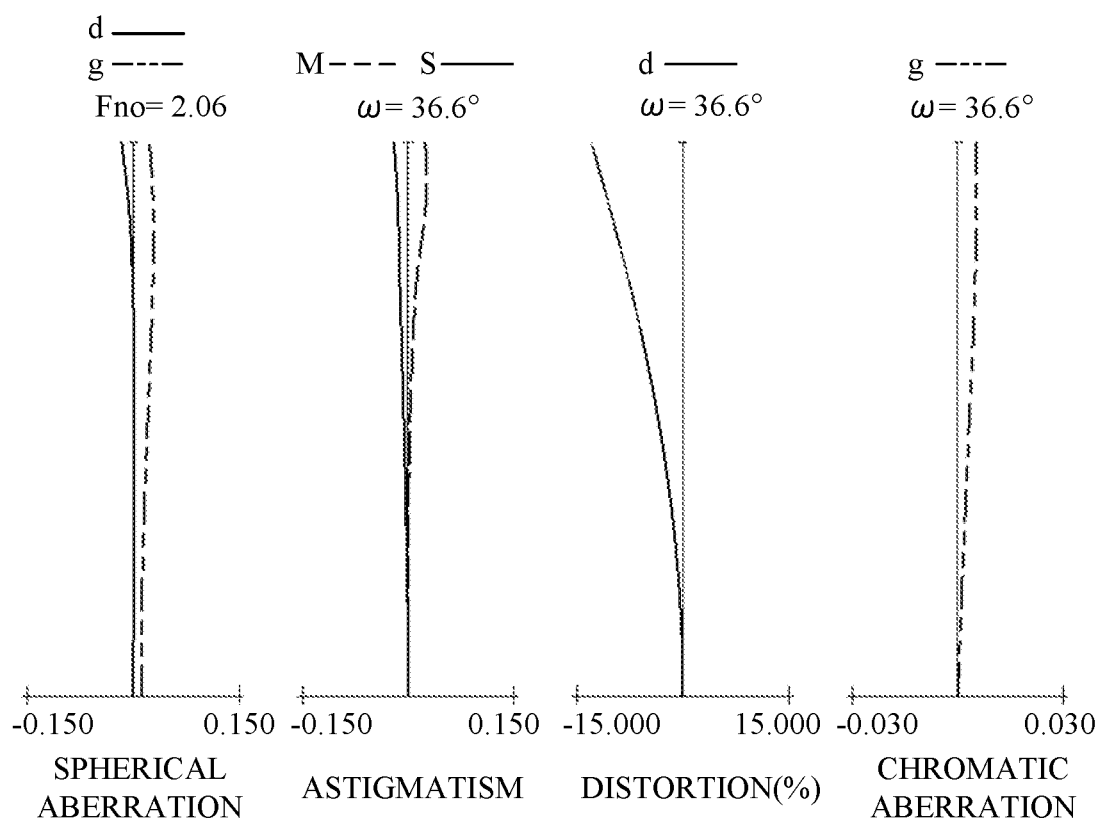
FIG. 18 is an aberration diagram at a wide-angle end in Example 5.
Figure 19:
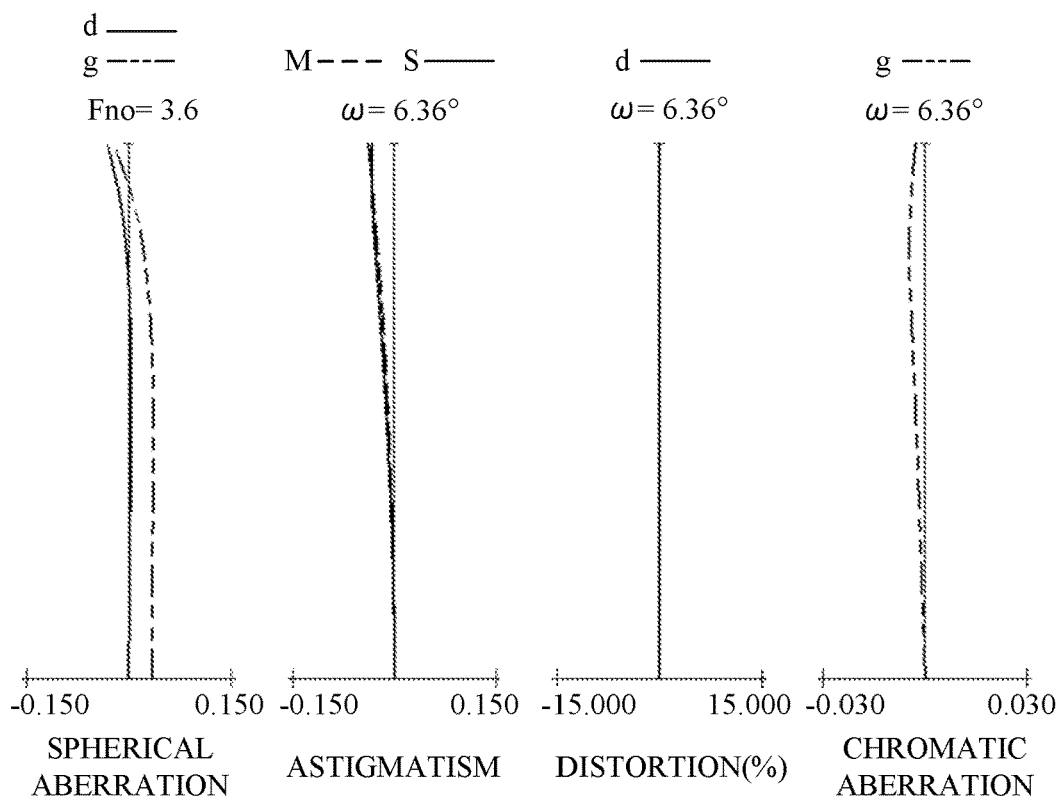
FIG. 19 is an aberration diagram at a middle focal length in Example 5.
Figure 20:
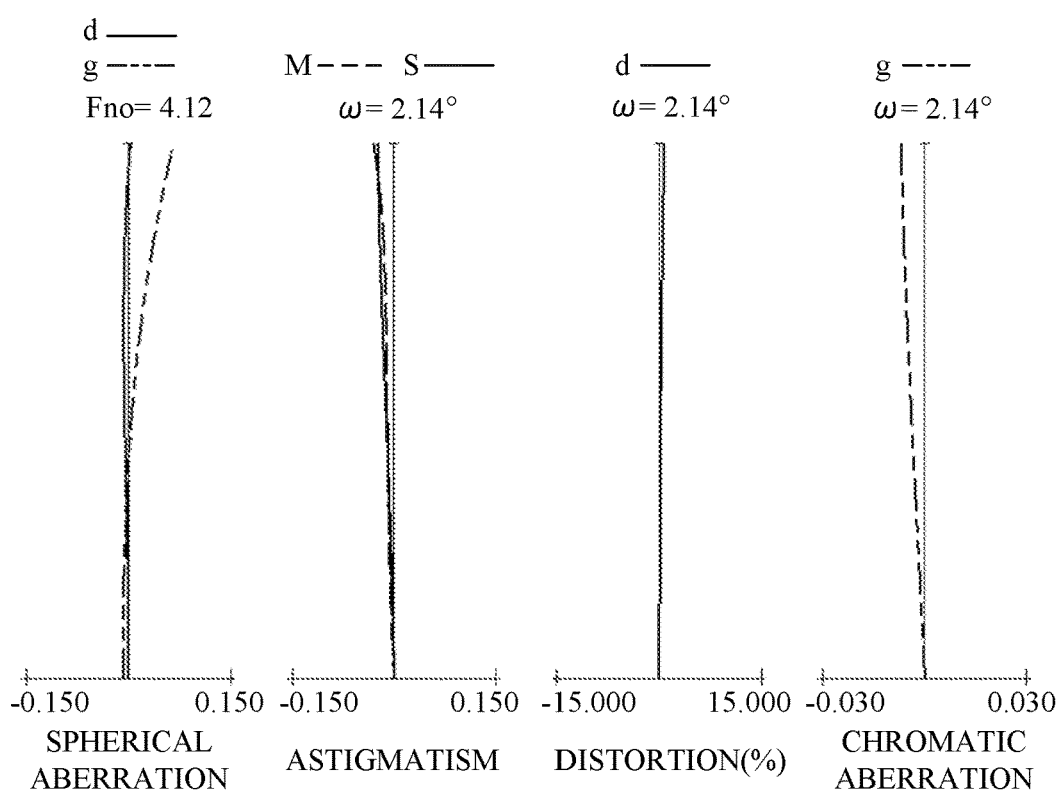
FIG. 20 is an aberration diagram at a telephoto end in Example 5.

In FIGS. 1 (Example 1) and 17 (Example 5), the middle lens unit is the third lens unit L3 including three lenses, and the final lens unit is the fourth lens unit L4. In FIG. 5 (Example 2), FIG. 9 (Example 3), and FIG. 13 (Example 4), the middle lens unit includes the third lens unit L3 and the fourth lens unit L4, and the final lens unit is the fifth lens unit L5. In FIGS. 5 and 13, the middle lens unit has totally three lenses. In FIG. 9, the middle lens unit has totally four lenses.

Numerical Examples 1 to 5 corresponding to Examples 1 to 5 will now be described. In each numerical example, ri is a radius of curvature of an i-th surface counted from the object side, di is a distance between an i-th surface and an (i+1)-th surface (lens thickness or air spacing), and ndi and vdi are respectively a refractive index and an Abbe number of the material of the i-th lens. The Abbe number vd is expressed as vd=(Nd−1)/(NF−NC) where Nd, NF, and NC are refractive indexes for the d-line (587.6 nm), the F-line (486.1 nm), and the C-line (656.3 nm) in the Fraunhofer line.

In each numerical example, all of "d," the focal length (mm), the F-number, and the half angle of view (degree) have values when the optical system (zoom lens) according to each example focuses on the object at infinity. BF (backfocus) is expressed by an air converted length of a distance on the optical axis from the final lens surface (lens surface closest to the image plane) to the paraxial image plane, which does not include a glass block. The "overall lens length" is a length obtained by adding the backfocus to the distance on the optical axis from the frontmost surface (lens surface closest to the object) to the final surface of the zoom lens. The "lens unit" is not limited to a plurality of lenses, and may include only a single lens.

When the optical surface is aspherical, a symbol * is added to the right of the surface number. The aspherical shape is expressed by the following expression (A).

$$X = \frac{(1/R)h^2}{1 + \sqrt{1-(1+k)(h/R)^2}} + A4h^4 + A6h^6 + A8h^8 + A10h^{10} + A3h^3 + A5h^5 + A7h^7 + A9h^9 + A11h^{11} \quad (A)$$

where an X-axis is set to the optical axis direction, an h-axis is set to a direction orthogonal to the optical axis, and a light traveling direction is set to be positive, R is a paraxial radius of curvature, and k is a conic constant, A3, A4, A5, A6, A7, A8, A9, A10, and A11 are aspheric coefficients.

Coefficients not listed in each numerical example are zero. For example, "e-Z" means "$10^{-Z}$". A half angle of view is a value obtained by ray tracing.

Numerical Example 1

| UNIT mm | | | |
|---|---|---|---|
| Surface data | | | |
| surface number | r | d | nd | vd |
| 1 | 55.076 | 1.43 | 1.90366 | 31.3 |
| 2 | 37.549 | 6.55 | 1.49700 | 81.5 |
| 3 | −427.274 | 0.17 | | |

-continued

UNIT mm

| | | | | |
|---|---|---|---|---|
| 4 | 37.663 | 3.51 | 1.49700 | 81.5 |
| 5 | 139.590 | (variable) | | |
| 6 | 217.940 | 0.90 | 1.90366 | 31.3 |
| 7 | 11.630 | 5.91 | | |
| 8 | −32.878 | 2.92 | 1.96300 | 24.1 |
| 9 | −14.758 | 0.74 | 1.80400 | 46.5 |
| 10 | 31.381 | 0.17 | | |
| 11 | 23.136 | 2.59 | 1.96300 | 24.1 |
| 12 | 149.908 | (variable) | | |
| 13(diaphragm) | ∞ | (variable) | | |
| 14* | 11.990 | 5.13 | 1.58313 | 59.4 |
| 15* | −96.919 | 4.22 | | |
| 16 | 55.161 | 0.84 | 1.91650 | 31.6 |
| 17 | 10.258 | 4.57 | | |
| 18 | 18.012 | 2.35 | 1.49700 | 81.5 |
| 19 | −44.048 | (variable) | | |
| 20 | 28.314 | 1.98 | 1.60342 | 38.0 |
| 21 | −53.097 | 0.73 | | |
| 22 | −18.201 | 0.60 | 1.59551 | 39.2 |
| 23 | 15.391 | 0.64 | | |
| 24 | 17.012 | 4.31 | 1.48749 | 70.2 |
| 25 | −15.207 | (variable) | | |
| 26 | ∞ | 0.92 | 1.51633 | 64.1 |
| 27 | ∞ | 1.00 | | |
| image plane | ∞ | | | |

ASPHERIC DATA

Fourteenth surface

K = −3.46301e−001     A 4 = −1.45222e−005

Fifteenth surface

K = 0.00000e+000     A 4 = 2.23251e−005

VARIOUS DATA
Zoom ratio 19.55

| | Wide-angle | Middle | Telephoto |
|---|---|---|---|
| Focal length | 6.69 | 43.97 | 130.75 |
| F-NUMBER | 2.06 | 3.60 | 4.12 |
| Half angle of view | 36.10 | 5.86 | 1.97 |
| Image height | 4.52 | 4.52 | 4.52 |
| Overall lens length | 124.77 | 124.77 | 124.77 |
| BF | 16.12 | 25.54 | 11.74 |
| d 5 | 0.97 | 30.22 | 39.96 |
| d12 | 40.40 | 11.15 | 1.41 |
| d13 | 14.69 | 1.34 | 1.34 |
| d19 | 2.34 | 6.26 | 20.07 |
| d25 | 14.52 | 23.94 | 10.13 |

ZOOM LENS UNIT DATA

| Unit | Starting surface | Focal length |
|---|---|---|
| 1 | 1 | 61.50 |
| 2 | 6 | −12.18 |
| 3 | 14 | 31.48 |
| 4 | 20 | 41.16 |
| 5 | 26 | ∞ |

Numerical Example 2

UNIT mm

Surface data

| surface number | r | d | nd | vd |
|---|---|---|---|---|
| 1 | 111.275 | 1.53 | 1.89190 | 37.1 |
| 2 | 49.992 | 5.53 | 1.49700 | 81.5 |
| 3 | −14027.800 | 0.17 | | |

-continued

UNIT mm

| | | | | |
|---|---|---|---|---|
| 4 | 53.558 | 3.62 | 1.49700 | 81.5 |
| 5 | 211.028 | 0.17 | | |
| 6 | 59.823 | 3.51 | 1.49700 | 81.5 |
| 7 | 407.517 | (variable) | | |
| 8 | −456.451 | 0.83 | 1.83481 | 42.7 |
| 9 | 12.920 | 6.06 | | |
| 10 | −26.535 | 2.11 | 1.96300 | 24.1 |
| 11 | −16.317 | 0.71 | 1.80400 | 46.5 |
| 12 | 81.362 | 0.17 | | |
| 13 | 31.966 | 2.26 | 1.96300 | 24.1 |
| 14 | 418.296 | (variable) | | |
| 15(diaphragm) | ∞ | (variable) | | |
| 16* | 11.038 | 4.59 | 1.55332 | 71.7 |
| 17* | −112.788 | 2.55 | | |
| 18 | 27.415 | 1.17 | 1.89190 | 37.1 |
| 19 | 9.856 | (variable) | | |
| 20 | 25.742 | 1.33 | 1.48749 | 70.2 |
| 21 | 349.321 | (variable) | | |
| 22 | 21.615 | 1.96 | 1.69680 | 55.5 |
| 23 | −129.475 | 0.61 | | |
| 24 | −27.326 | 0.60 | 1.60342 | 38.0 |
| 25 | 18.051 | 1.49 | | |
| 26 | 20.275 | 3.38 | 1.48749 | 70.2 |
| 27 | −21.505 | (variable) | | |
| 28 | ∞ | 0.92 | 1.51633 | 64.1 |
| 29 | ∞ | 1.00 | | |
| image plane | ∞ | | | |

ASPHERIC DATA

Sixteenth surface

K = −5.16072e−001     A 4 = −9.09293e−006

Seventeenth surface

K = 0.00000e+000     A 4 = 1.27349e−005

VARIOUS DATA
Zoom ratio 29.55

| | Wide-angle | Middle | Telephoto |
|---|---|---|---|
| Focal length | 6.18 | 40.49 | 182.67 |
| F-NUMBER | 2.06 | 3.86 | 4.64 |
| Half angle of view | 36.10 | 6.40 | 1.40 |
| Image height | 3.93 | 4.52 | 4.52 |
| Overall lens length | 138.78 | 138.78 | 138.78 |
| BF | 15.76 | 25.23 | 7.71 |
| d 7 | 1.14 | 34.89 | 49.35 |
| d14 | 49.71 | 15.97 | 1.50 |
| d15 | 17.35 | 1.49 | 1.50 |
| d19 | 7.42 | 4.35 | 1.98 |
| d21 | 3.07 | 12.52 | 32.42 |
| d27 | 14.15 | 23.63 | 6.10 |

ZOOM LENS UNIT DATA

| Unit | Starting surface | Focal length |
|---|---|---|
| 1 | 1 | 71.21 |
| 2 | 8 | −13.52 |
| 3 | 16 | 57.88 |
| 4 | 20 | 56.93 |
| 5 | 22 | 33.73 |
| 6 | 28 | ∞ |

Numerical Example 3

UNIT mm

Surface data

| surface number | r | d | nd | vd |
|---|---|---|---|---|
| 1 | 149.713 | 1.27 | 1.89190 | 37.1 |
| 2 | 74.283 | 8.05 | 1.43875 | 94.9 |
| 3 | −613.897 | 0.17 | | |
| 4 | 76.249 | 5.48 | 1.43875 | 94.9 |
| 5 | 604.530 | 0.17 | | |
| 6 | 60.064 | 6.04 | 1.43875 | 94.9 |
| 7 | 303.867 | (variable) | | |
| 8 | −190.063 | 0.73 | 1.83481 | 42.7 |
| 9 | 14.774 | 5.66 | | |
| 10 | −38.001 | 2.07 | 1.96300 | 24.1 |
| 11 | −20.784 | 0.73 | 1.80400 | 46.5 |
| 12 | 44.104 | 0.55 | | |
| 13 | 29.629 | 2.51 | 1.96300 | 24.1 |
| 14 | 216.592 | (variable) | | |
| 15(diaphragm) | ∞ | (variable) | | |
| 16* | 10.649 | 3.11 | 1.55332 | 71.7 |
| 17* | −232.295 | 1.97 | | |
| 18 | 17.694 | 1.15 | 1.89190 | 37.1 |
| 19 | 9.263 | 0.89 | | |
| 20 | 26.124 | 1.79 | 1.65100 | 56.2 |
| 21 | 19.188 | (variable) | | |
| 22 | 21.571 | 2.12 | 1.48749 | 70.2 |
| 23 | 26.476 | (variable) | | |
| 24 | 24.332 | 1.32 | 1.69680 | 55.5 |
| 25 | 114.197 | 1.21 | | |
| 26 | −18.585 | 0.59 | 1.60342 | 38.0 |
| 27 | 30.130 | 0.17 | | |
| 28 | 30.969 | 2.69 | 1.48749 | 70.2 |
| 29 | −21.930 | 0.17 | | |
| 30 | 53.662 | 1.83 | 1.59522 | 67.7 |
| 31 | −38.222 | (variable) | | |
| 32 | ∞ | 0.92 | 1.51633 | 64.1 |
| 33 | ∞ | 1.69 | | |
| image plane | ∞ | | | |

ASPHERIC DATA

Sixteenth surface

K = −5.26702e−001    A 4 = −6.72646e−006

Seventeenth surface

K = 0.00000e+000    A 4 = 9.13258e−006

VARIOUS DATA
Zoom ratio 42.00

| | Wide-angle | Middle | Telephoto |
|---|---|---|---|
| Focal length | 6.19 | 42.07 | 259.96 |
| F-NUMBER | 2.88 | 4.11 | 4.63 |
| Half angle of view | 36.10 | 6.16 | 0.98 |
| Image height | 3.93 | 4.52 | 4.52 |
| Overall lens length | 160.07 | 160.07 | 160.07 |
| BF | 17.99 | 28.43 | 6.91 |
| d 7 | 1.45 | 45.06 | 63.74 |
| d14 | 63.79 | 20.18 | 1.49 |
| d15 | 16.04 | 1.50 | 1.50 |
| d21 | 3.99 | 1.36 | 0.76 |
| d23 | 4.39 | 11.13 | 33.24 |
| d31 | 15.70 | 26.14 | 4.61 |

ZOOM LENS UNIT DATA

| Unit | Starting surface | Focal length |
|---|---|---|
| 1 | 1 | 87.77 |
| 2 | 8 | −14.68 |
| 3 | 16 | 54.18 |
| 4 | 22 | 209.23 |
| 5 | 24 | 28.32 |
| 6 | 32 | ∞ |

Numerical Example 4

UNIT mm

Surface data

| surface number | r | d | nd | vd |
|---|---|---|---|---|
| 1 | 62.049 | 1.41 | 1.90366 | 31.3 |
| 2 | 38.941 | 6.12 | 1.49700 | 81.5 |
| 3 | −295.843 | 0.17 | | |
| 4 | 36.416 | 3.83 | 1.49700 | 81.5 |
| 5 | 189.824 | (variable) | | |
| 6 | −242.316 | 0.76 | 1.83481 | 42.7 |
| 7 | 11.487 | 5.22 | | |
| 8 | −24.260 | 2.23 | 1.96300 | 24.1 |
| 9 | −13.676 | 0.62 | 1.80400 | 46.5 |
| 10 | 66.385 | 0.17 | | |
| 11 | 27.280 | 1.85 | 1.96300 | 24.1 |
| 12 | 123.907 | (variable) | | |
| 13(diaphragm) | ∞ | (variable) | | |
| 14* | 11.895 | 5.80 | 1.55332 | 71.7 |
| 15* | −64.584 | 1.51 | | |
| 16 | 23.255 | 1.17 | 1.69895 | 30.1 |
| 17 | 9.934 | (variable) | | |
| 18 | 23.741 | 1.35 | 1.48749 | 70.2 |
| 19 | 208.387 | (variable) | | |
| 20 | 20.064 | 1.77 | 1.60311 | 60.6 |
| 21 | −834.502 | 0.39 | | |
| 22 | −45.052 | 0.60 | 1.60342 | 38.0 |
| 23 | 16.327 | 1.93 | | |
| 24 | 17.162 | 2.96 | 1.48749 | 70.2 |
| 25 | −30.770 | (variable) | | |
| 26 | ∞ | 0.92 | 1.51633 | 64.1 |
| 27 | ∞ | 1.00 | | |
| image plane | ∞ | | | |

ASPHERIC DATA

Fourteenth surface

K = −4.74092e−001    A 4 = −1.81897e−005

Fifteenth surface

K = 0.00000e+000    A 4 = 2.30026e−005

VARIOUS DATA
Zoom ratio 19.68

| | Wide-angle | Middle | Telephoto |
|---|---|---|---|
| Focal length | 6.18 | 36.34 | 121.64 |
| F-NUMBER | 2.06 | 3.50 | 4.12 |
| Half angle of view | 36.10 | 7.11 | 2.10 |
| Image height | 3.93 | 4.52 | 4.52 |
| Overall lens length | 118.73 | 118.73 | 118.73 |
| BF | 12.26 | 19.42 | 9.90 |
| d 5 | 1.33 | 27.47 | 38.67 |
| d12 | 38.93 | 12.80 | 1.60 |
| d13 | 12.92 | 1.40 | 1.40 |
| d17 | 11.86 | 4.22 | 1.84 |
| d19 | 1.56 | 13.55 | 25.46 |
| d25 | 10.65 | 17.82 | 8.30 |

-continued

UNIT mm

ZOOM LENS UNIT DATA

| Unit | Starting surface | Focal length |
|---|---|---|
| 1 | 1 | 59.87 |
| 2 | 6 | −11.21 |
| 3 | 14 | 36.72 |
| 4 | 18 | 54.83 |
| 5 | 20 | 38.47 |
| 6 | 26 | ∞ |

Numerical Example 5

UNIT mm

Surface data

| surface number | r | d | nd | vd |
|---|---|---|---|---|
| 1 | 67.766 | 1.18 | 1.90366 | 31.3 |
| 2 | 44.141 | 4.36 | 1.49700 | 81.5 |
| 3 | −281.156 | 0.17 | | |
| 4 | 38.910 | 2.93 | 1.49700 | 81.5 |
| 5 | 114.261 | (variable) | | |
| 6 | −1090.414 | 0.69 | 1.90366 | 31.3 |
| 7 | 10.714 | 4.46 | | |
| 8 | −28.296 | 2.05 | 1.96300 | 24.1 |
| 9 | −14.209 | 0.60 | 1.80400 | 46.5 |
| 10 | 30.405 | 0.17 | | |
| 11 | 21.655 | 2.43 | 1.96300 | 24.1 |
| 12 | −2310.216 | (variable) | | |
| 13(diaphragm) | ∞ | (variable) | | |
| 14* | 9.876 | 3.84 | 1.58313 | 59.4 |
| 15* | −215.273 | 2.90 | | |
| 16 | 32.417 | 0.60 | 1.91650 | 31.6 |
| 17 | 8.960 | 3.19 | | |
| 18 | 16.739 | 2.17 | 1.49700 | 81.5 |
| 19 | −43.497 | (variable) | | |
| 20 | 25.111 | 1.73 | 1.60342 | 38.0 |
| 21 | −74.016 | 1.00 | | |
| 22 | −18.806 | 0.60 | 1.59551 | 39.2 |
| 23 | 14.015 | 0.17 | | |
| 24 | 14.143 | 4.01 | 1.48749 | 70.2 |
| 25 | −15.505 | (variable) | | |
| 26 | ∞ | 0.92 | 1.51633 | 64.1 |
| 27 | ∞ | 1.00 | | |
| image plane | ∞ | | | |

ASPHERIC DATA

Fourteenth surface

K = −4.38342e−001    A4 = −1.90277e−005

Fifteenth surface

K = 0.00000e+000    A4 = 1.61436e−005

VARIOUS DATA
Zoom ratio 19.71

| | Wide-angle | Middle | Telephoto |
|---|---|---|---|
| Focal length | 6.09 | 40.53 | 119.98 |
| F-NUMBER | 2.06 | 3.60 | 4.12 |
| Half angle of view | 36.60 | 6.36 | 2.14 |
| Image height | 3.93 | 4.52 | 4.52 |
| Overall lens length | 99.75 | 109.75 | 118.47 |
| BF | 14.21 | 26.82 | 10.14 |
| d 5 | 1.24 | 33.78 | 50.00 |
| d12 | 32.66 | 2.13 | 1.60 |

-continued

UNIT mm

| | | | |
|---|---|---|---|
| d13 | 10.87 | 4.44 | 1.40 |
| d19 | 1.52 | 3.34 | 16.08 |
| d25 | 12.60 | 25.21 | 8.53 |

ZOOM LENS UNIT DATA

| Unit | Starting surface | Focal length |
|---|---|---|
| 1 | 1 | 69.79 |
| 2 | 6 | −11.73 |
| 3 | 14 | 26.14 |
| 4 | 20 | 39.93 |
| 5 | 26 | ∞ |

Table 1 shows the relationship between each of the above-mentioned conditional expressions and various numerical values in each numerical value embodiment.

TABLE 1

| CONDITIONAL EXPRESSION | NUMERICAL EXAMPLE | | | | |
|---|---|---|---|---|---|
| | 1 | 2 | 3 | 4 | 5 |
| (1) | 0.957 | 0.761 | 0.617 | 0.979 | 0.990 |
| (2) | −0.375 | −0.549 | −0.272 | −1.059 | −0.272 |
| (3) | 0.000 | −5.448 | −3.230 | −10.023 | 0.000 |
| (4) | 0.312 | 0.347 | 0.388 | 0.314 | 0.253 |
| (5) | 0.298 | 0.264 | 0.240 | 0.307 | 0.250 |
| (6) | 0.145 | 0.128 | 0.074 | 0.323 | 0.122 |
| (7) | −0.342 | −0.329 | −0.233 | −0.309 | −0.349 |

Figure 21:
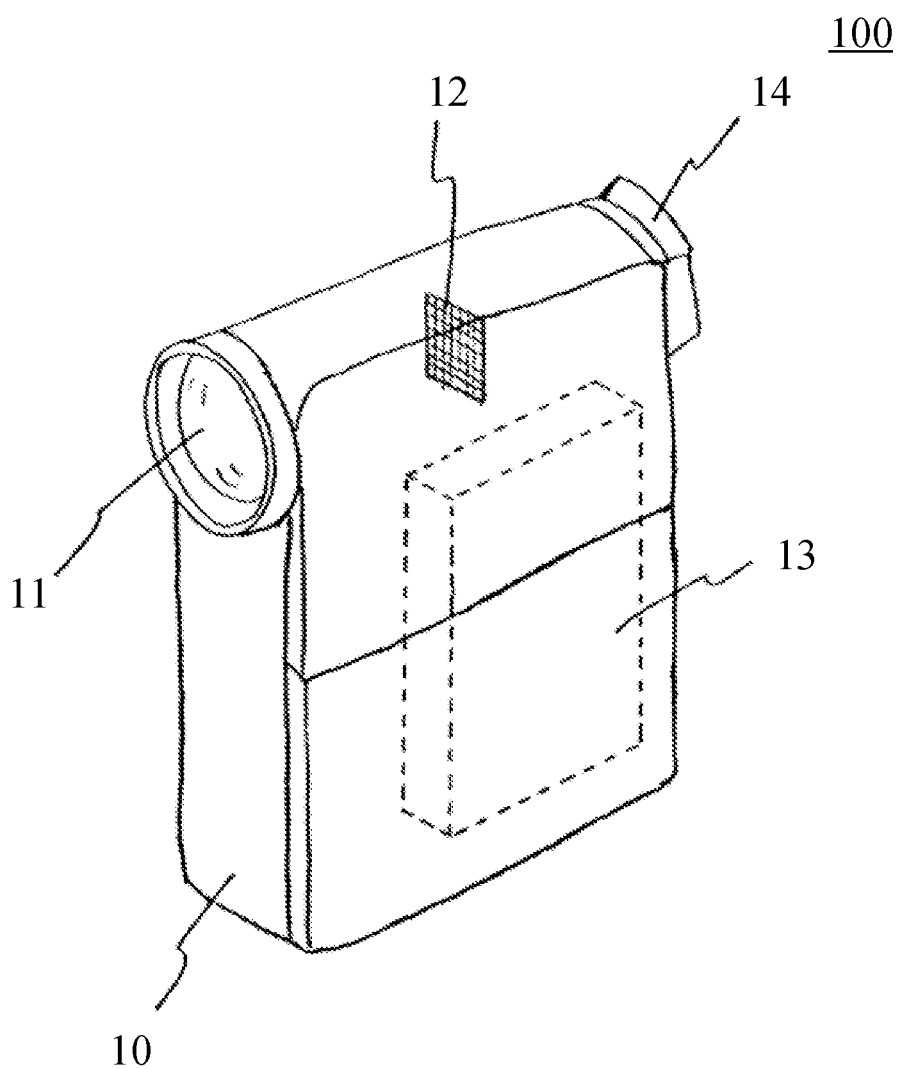
FIG. 21 is a schematic view of an image pickup apparatus in each example.

Next, with reference to FIG. 21, an image pickup apparatus using the zoom lens of each embodiment as an image pickup optical system will be described. FIG. 21 is a schematic view of an imaging device (video camera) 100 of each embodiment. In FIG. 21, 10 is a video camera main body, and 11 is an imaging optical system using the zoom lens of each embodiment. Reference numeral 12 denotes an image pickup element (image sensor) such as a CMOS sensor or a CCD sensor. The image pickup element 12 photoelectrically converts an object image (optical image) formed via the image pickup optical system 11 (takes an image formed by a zoom lens). Reference numeral 13 denotes a recording means (memory) for recording the object image captured by the image pickup element 12. Reference numeral 14 denotes a finder for observing the object image displayed on a display element (not shown). The display element is composed of a liquid crystal panel or the like, and the object image formed on the image pickup element 12 is displayed.

By applying the zoom lens of each embodiment to an imaging device such as a video camera in this way, it is possible to realize an imaging device that is compact and has high optical performance. Since the image pickup element 12 is an electronic image sensor such as a CCD sensor, it is possible to further improve the image quality of the output image by electronically correcting the aberration. According to each embodiment, for example, it is possible to provide a zoom lens and an imaging device which are advantageous in terms of small size, high magnification, and high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-233678, filed on Dec. 25, 2019 which is hereby incorporated by reference herein in its entirety.

What is claimed is:

1. A zoom lens comprising, in order from an object side to an image side, a first lens unit having a positive refractive power, a second lens unit having a negative refractive power, one or two intermediate lens units having positive refractive powers, and a final lens unit having a positive power,
- wherein a distance between each pair of adjacent lens units changes in zooming from a wide-angle end to a telephoto end,
- wherein the one or two intermediate lens units include three or four lenses,
- wherein the one or two intermediate lens units include a single lens having a positive refractive power and being closest to the image side,
- wherein the final lens unit includes three or four lenses, and
- wherein following conditional expressions are satisfied:

$$0.50 < LDt/ft < 1.00$$

$$-1.40 < Dpow/f2 < -0.27$$

where LDt is an overall optical length of the zoom lens at the telephoto end, ft is a focal length of the zoom lens at the telephoto end, Dpow is an air spacing length on the object side adjacent to the single lens at the wide-angle end, and f2 is a focal length of the second lens unit.

2. The zoom lens according to claim 1, wherein a following conditional expression is satisfied:

$$Dpot - Dpow \leq 0.00$$

where Dpot is an air spacing length on the object side adjacent to the single lens at the telephoto end.

3. The zoom lens according to claim 1, wherein at least the second lens unit and the final lens unit move in zooming.

4. The zoom lens according to claim 1, wherein a following conditional expression is satisfied:

$$0.23 < M2/LDt < 0.43$$

where M2 is a moving amount of the second lens unit from the wide-angle end to the telephoto end, and has a positive sign in a case where the second lens unit is closer to the image side at the telephoto end than at the wide-angle end.

5. The zoom lens according to claim 4, wherein a following conditional expression is satisfied:

$$0.22 < M2/ft < 0.34.$$

6. The zoom lens according to claim 1, wherein a following conditional expression is satisfied:

$$0.06 < Dpow/f3 < 0.50$$

where f3 is a focal length of one of the one or two intermediate lens units which is located on the object side.

7. The zoom lens according to claim 4, wherein a following conditional expression is satisfied:

$$-0.38 < M3/M2 < -0.21$$

where M3 is a moving amount from the wide-angle end to the telephoto end of one of the one or two intermediate lens units which is located on the object side, M3 having a positive sign in a case where the one of the one or two intermediate lens units located on the object side is closer to the image side at the telephoto end than at the wide-angle end.

8. The zoom lens according to claim 1, wherein the first lens unit does not move for zooming.

9. An image pickup apparatus comprising:
- a zoom lens; and
- an image pickup element configured to pick up an image formed by the zoom lens,
- wherein the zoom lens includes, in order from an object side to an image side, a first lens unit having a positive refractive power, a second lens unit having a negative refractive power, one or two intermediate lens units having positive refractive powers, and a final lens unit having a positive power,
- wherein a distance between each pair of adjacent lens units changes in zooming from a wide-angle end to a telephoto end,
- wherein the one or two intermediate lens units include three or four lenses,
- wherein the one or two intermediate lens units include a single lens having a positive refractive power and being closest to the image side,
- wherein the final lens unit includes three or four lenses, and
- wherein following conditional expressions are satisfied:

$$0.50 < LDt/ft < 1.00$$

$$-1.40 < Dpow/f2 < -0.27$$

where LDt is an overall optical length of the zoom lens at the telephoto end, ft is a focal length of the zoom lens at the telephoto end, Dpow is an air spacing length on the object side adjacent to the single lens at the wide-angle end, and f2 is a focal length of the second lens unit.

* * * * *